Feb. 28, 1961 C. E. TACK 2,973,103
COUPLER BEARING BLOCK ASSEMBLY
Filed May 22, 1959

INVENTOR.
Carl E. Tack
BY Walter L. Schlegel, Jr.

United States Patent Office 2,973,103
Patented Feb. 28, 1961

2,973,103

COUPLER BEARING BLOCK ASSEMBLY

Carl E. Tack, Elmhurst, Ill., assignor to American Steel Foundries, Chicago, Ill., a corporation of New Jersey Filed May 22, 1959, Ser. No. 815,044

1 Claim. (Cl. 213—64)

This invention relates to railway car couplers, particularly of the type wherein the shank is provided with a bearing block adapted to cooperate with a pin to accommodate vertical and horizontal angling of the coupler during operation thereof.

In certain types of railway couplers, the coupler shank is provided with an opening which receives a pin utilized to secure the coupler to an associated yoke. The pin opening also receives a bearing block which is held in place by spring means. The pin and the bearing block, however, are subject to wear and from time to time must be disassembled for maintenance purposes or for replacement. Frequently, the bearing block and spring of a disassembled unit becomes separated thereby necessitating a vexatious search for the original spring or a replacement therefor. Similarly, when a bearing block assembly requires replacement, the spring is very often missing from the replacement assembly. This, of course, results in the necessity of maintaining an inventory of surplus springs and results also in an increase in the time spent for servicing and repairs.

From time to time, various solutions to this problem have been proposed, such as taping or wiring the spring to the bearing block, but none of the proposals have been satisfactory.

The primary object, therefore, of the present invention, is the provision of an arrangement for preventing accidental separation of the bearing block spring from the bearing block. It is a further object of the invention that the foregoing arrangement accommodate rapid and simple replacement of an individual spring in a bearing block in those instances, for example, when a spring is broken but the bearing block is still usable.

These and other objects will become apparent from the following description and accompanying drawings wherein.

Figure 1:
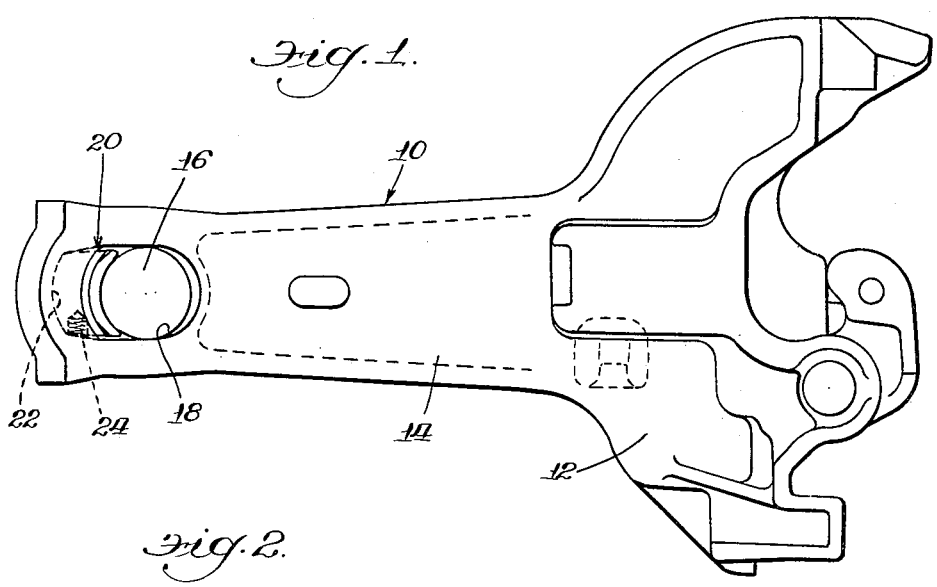
Figure 1 is a plan view of a railway car coupler incorporating the novel bearing block and spring assembly.
Figure 2:
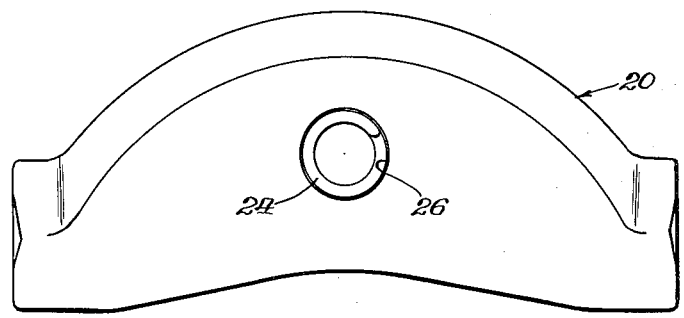
Figure 2 is a side elevational view of the bearing block and spring assembly.

Referring now to the drawings and particularly to Figure 1, it is seen that the arrangement comprises a coupler generally designated 10 having a head 12 and a shank 14. The shank is arranged to be received within a yoke (not shown) in a conventional manner and secured therein by means of a pin 16 extending through an opening 18 in the shank. The opening 18 is also arranged to receive a bearing block, generally designated 20, which slidably engages the pin 16 and which is in complementary arcuate thrust engagement as at 22 with the shank 14 at the rear extremity of the opening 18.

Figure 3:
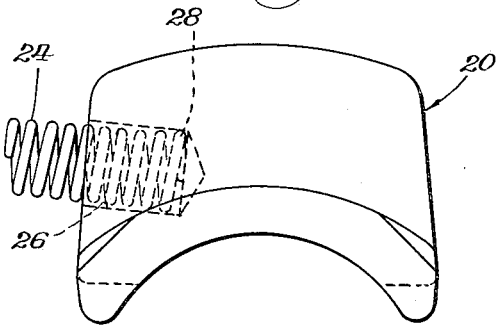
Figure 3 is a top plan view of the bearing block and spring assembly illustrating the preferred embodiment of the invention.

The bearing block 20 is resiliently retained in assembled relationship with the shank 14 by means of a spring 24 which is received within a blind hole 26 as best seen in Figure 3. A portion of the spring extends outwardly of the hole 26 so that the spring must be compressed when the bearing block is assembled in the shank at which time the spring bears against an internal face of the shank and biases the bearing block against the opposite face of the shank in a conventional manner.

In some instances the bearing block design may include a second opening (not shown) disposed oppositely of the opening 26. The two springs which are necessary when utilizing two holes urge the bearing block against the rear wall at 22 while holding the block centered in the shank opening 18.

Figure 4:
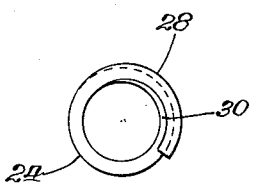
Figure 4 is an end view of the novel spring showing the preferred embodiment thereof prior to assembly into the bearing block.

As seen in Figure 3, the body of the spring has an outer diameter which is slightly smaller than the diameter of the hole 26 in which the spring is received. Figure 4 illustrates the preferred form of a spring which may be utilized to prevent the spring from becoming separated from the bearing block when the bearing block is disassembled from the shank and, also, when the bearing block assembly is held in inventory prior to use with a coupler. According to the preferred embodiment of the invention, the end coil 28 of the spring 24 is expanded a sufficient amount so that the effective diameter of the spring is slightly greater than the diameter of the hole 26. The amount of expansion of the end coil is preferably approximately equal to half the diameter of the wire from which the spring is made, but it is believed obvious that this amount may vary considerably and will be dependent upon the wire diameter, spring diameter and hole diameter of the particular arrangement. The primary requisite is that the end coil be expanded or distorted a sufficient amount so that at one point the diametral distance across the spring is greater than the diameter of the hole. Now, when a spring is assembled into the bearing block, the end coil is compressed slightly and the spring is retained in the hole by the spring action of the end coil against the periphery of the hole. This arrangement not only serves to prevent accidental disassembly of the bearing block and spring but also accommodates easy removal and replacement of a broken spring.

It is seen therefore, that a simple but effecitve means has been provided for effectively preventing accidental disassembly of a spring from a bearing block, thereby greatly decreasing inventory costs and also facilitating replacement of a bearing block and spring assembly into a coupler shank.

I claim:

A railway car coupler comprising: a shank having an opening; a bearing block received in said opening, said bearing block having at least one hole extending partially therethrough; a spring received in said hole and projecting outwardly thereof for resiliently holding the bearing block in the shank opening; and means for preventing accidental removal of said spring from said hole when the bearing block is disassembled from the coupler shank, said means comprising an end coil of said spring expanded radially outward from the other coils with its diameter, before insertion of the spring into the opening, being larger than the diameter of the opening so that when the spring is disposed within the opening with said end coil at the closed end thereof said end coil will exert a pressure radially on the periphery of said opening.

References Cited in the file of this patent

UNITED STATES PATENTS

| 1,882,943 | Ross | Oct. 18, 1932 |
| 2,254,302 | Metzger | Sept. 2, 1941 |
| 2,755,699 | Forster | July 24, 1956 |
| 2,889,940 | Metzger | June 9, 1959 |